(12) United States Patent
Barillaud

(10) Patent No.: US 6,785,736 B1
(45) Date of Patent: Aug. 31, 2004

(54) METHOD AND SYSTEM FOR OPTIMIZING THE NETWORK PATH OF MOBILE PROGRAMS

(75) Inventor: Franck Barillaud, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 728 days.

(21) Appl. No.: 09/659,639

(22) Filed: Sep. 12, 2000

(51) Int. Cl.[7] .......................................... G06F 15/173
(52) U.S. Cl. .................... 709/241; 709/239; 370/235; 370/238
(58) Field of Search ................................. 709/238, 239, 709/240, 241, 242, 243, 244

(56) References Cited

U.S. PATENT DOCUMENTS

| | | | |
|---|---|---|---|
| 5,701,484 A | 12/1997 | Artsy | 395/683 |
| 5,825,772 A | 10/1998 | Dobbins et al. | 370/396 |
| 5,933,818 A * | 8/1999 | Kasravi et al. | 706/12 |
| 6,081,722 A * | 6/2000 | Duque-Anton et al. | 455/452.2 |
| 6,226,408 B1 * | 5/2001 | Sirosh | 382/224 |
| 6,260,072 B1 * | 7/2001 | Rodriguez-Moral | 709/241 |
| 6,321,216 B1 * | 11/2001 | Otte et al. | 706/21 |
| 6,385,615 B1 * | 5/2002 | Haeri et al. | 707/10 |
| 6,584,071 B1 * | 6/2003 | Kodialam et al. | 370/238 |
| 6,633,544 B1 * | 10/2003 | Rexford et al. | 370/238 |
| 6,636,742 B1 * | 10/2003 | Torkki et al. | 455/433 |

OTHER PUBLICATIONS

Bui M et al.: "Randomized Adaptive Routing Based on Mobile Agents" Proceedings Fourth International Symposium on Parallel Architectures, Algorithms, and Networks (I–Span '99), Proceedings of 1999 International Symposium on Parallel Architecture, Algorithms and Networks, Perth/Fremantle, WA, Australia, Jun. 23–25, 1999, pp. 380–385, XP002130324 1999, Los Alamitos, CA, USA, IEEE Comput. Soc, USA ISBN: 0–7695–0231–8.

* cited by examiner

Primary Examiner—David Wiley
Assistant Examiner—Phuoc Nguyen
(74) Attorney, Agent, or Firm—Daniel E. McConnell

(57) ABSTRACT

A method and system for computing the shortest path for traveling inside a network and visiting a predefined list of network addresses. The method can be used by a system management workstation communicating and a mobile program visiting the list of networks addresses; the system management workstation communicates with said mobile program to get the list of network addresses to be visited; the system management workstation communicates also with all the networks addresses of the list to get the parameter values for determining the shortest path. The system management platform computes the shortest path by running a Kohonen neural network reading in input the references to nodes and their,parameter values which form bi dimensional coordinates; the output is the ordered list of network addresses to be visited by the mobile program.

12 Claims, 5 Drawing Sheets

ACCESS TIME BETWEEN NODE

SHORTEST PATH

METHOD AND SYSTEM FOR OPTIMIZING THE NETWORK PATH OF MOBILE PROGRAMS

FIELD OF THE INVENTION

This invention relates to a method and system for computing the shortest path in a communications network; more particularly, the invention optimizes the move within the network of an independent program having to execute itself on a list of designated nodes of the network.

BACKGROUND OF THE INVENTION

Network management applications, operating on network management workstations, remotely control various network components. More and more network management applications become system management applications by providing services to the network components such as handling of statistic collection, maintenance tests, software distribution etc . . . . The main principle is to bring the management program close to the component in order to better perform various tasks than when they were remotely performed. With the current solution of the prior art, each network component served by the system manager stores a copy of service programs the execution of which is remotely started from the system manager work station. This solution is costly because the network components have not always the storage capacity for all the programs corresponding to the services. As an example, in order to control from the system manager station what is the software level operating on such a network component (router, server etc . . . ), an inventory program should be installed on the network components in order to operate under the remote activation sent from the system management workstation. This means that if 500 machines are controlled by the system manager the same program is stored 500 times. As these programs are only temporarily used, it is not necessary to store them in the network component.

An improved method consists in managing from the system management workstation a program (so called a 'mobile program') able to travel over the network and to execute a service program on a given list of target network elements. Once the program is executed on one network element component, the mobile program chooses which will be the next network element to serve, and reach it having freed all the computing resources from the current previous network element. When all the network components have been served, there is no more trace of the mobile program in any visited network component. It is noted that the mechanism for transferring the mobile program from one node to the other is performed by programs to be run on the network nodes such as 'Voyager' from the company 'ObjectSpace and documented in the following WEB page: http://www.objectspace.com/.

With the constant need of limiting the computing resources in the network component, this method is an improvement because it reduces at least storage resources in the network components; however, when traveling inside the network, in order to save the global computing resources and to provide an efficient service in term of response time, it is necessary to optimize the travel of the mobile program inside the network when serving the network elements for which it is responsible.

Defining the best route of travel raises the well known Traveling Salesman Problem. The Traveling Salesman Problem is a classical problem in the field of combination optimization. A salesman must visit different cities spread across the country. In order to minimize the travel, the salesman has to visit each city once and only once. The problem is to define the order he should visit these cities to minimize the total distance of the travel. The solution consists in calculating all the possible orders, to compute the total travel distance and to select the order corresponding to the shortest distance. All exact methods to compute the shortest travel distance consume computing resources exponentially increasing with the number of cities. Practically, an exact solution can be attempted to be computed only for travels including no more than a few hundred cities.

The best path is not always the shortest physical path; the choice for the best path can be done on the basis of many criteria: one can choose to minimize the congestion by using the links between the machines that offer the biggest bandwidth or one can choose to minimize the response time by using the higher speed links; one can also choose a mixed approach or any other approach corresponding to a specific network criterion: CPU utilization, minimum protocol conversion etc . . . . For instance, traveling inside a LAN is quicker and less costly than using heterogeneous protocol lines implying protocol conversion.

Basically the Shortest Path problem may be solved today using two different well-known algorithms. The Dijkstra's algorithm or the Warshall-Floyd's algorithm described in the following URL:

http://www-unix.mcs.anl.gov/dbpp/text/node35.html.

These methods imply sophisticated matrix mathematical calculations requiring a large coding effort and a significant amount of computing resources to execute the corresponding application.

SUMMARY OF THE INVENTION

It is therefore a purpose of the present invention to optimize the travel in a communication network in order to automatically obtain an optimized path within the network when visiting a predefined list of network nodes.

It is a further purpose of the invention to have this method able to take into account for optimization various criteria such as: path length, conversion protocol and line bandwidth.

It is a following purpose of the invention to find a method using a minimum of computing resources in the network nodes.

One advantage of the method when applied to mobile program traveling within the network is that it can dynamically adapt to any change collected at the nodes to be visited in order to compute the best path according to the criteria which have been chosen.

One other advantage is to have a method limiting the coding effort by using the services of a network management protocol and by using a neural network. The method also limits the computing resources on the nodes as the calculation is done from the network management station.

BRIEF DESCRIPTION OF THE DRAWINGS

The foregoing and other objects, aspects and advantages will be better understood from the following detailed description of a preferred embodiment of the invention with reference to the drawings in which.

DETAILED DESCRIPTION OF THE PREFERRED EMBODIMENT

In the preferred embodiment is described a method for optimizing the path of a mobile program traveling within a communications network to operate on a list of network nodes system management service tasks.

Figure 1:
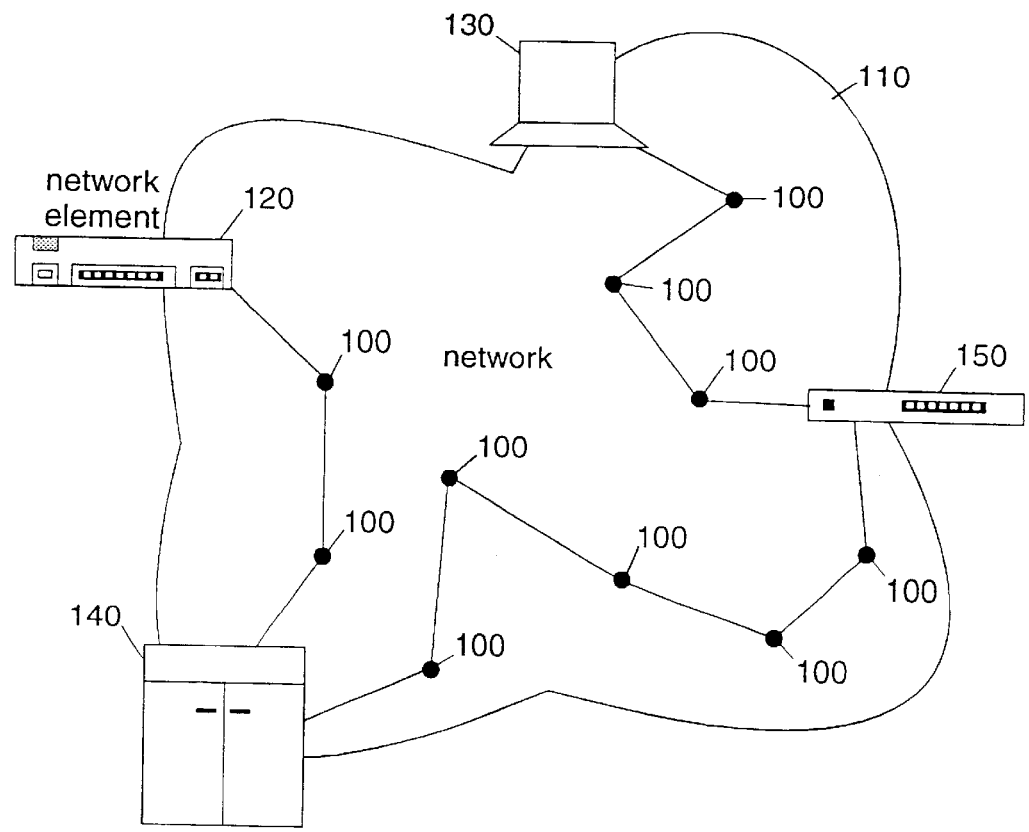
FIG. 1 illustrates the travel of a mobile program in a network.

Referring to FIG. 1, there is shown in a network (110) comprising network elements which could be the physical address of a device or the logical address of an application (100, 120, 130, 140, 150). The network elements highlighted in said network (110) are successively visited from the first network element (120) to the last network element (130) by a mobile program. Some network elements are workstations (130) or hubs (120) or routers (150) or data base servers (140). According to the system management application, the mobile program when reaching a network element will execute a service program such as a software update or collect of statistics etc . . . , asks the system management platform to send back a computed path, deletes any storage use in the current network element and sends itself to the next network element node of its computed path. The mobile program asks the shortest path to the system management workstation when it starts its travel. One other mode of operation could be to ask for shortest path calculation during the travel of the mobile program, at any time when a specific event is identified.

Figure 2:
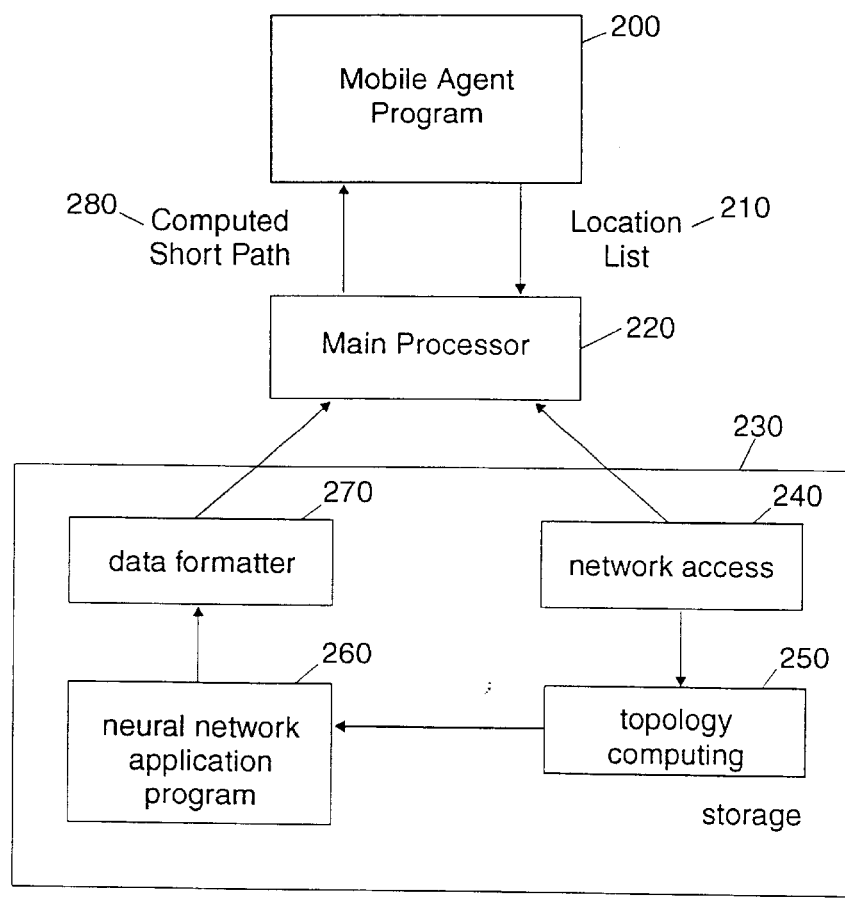
FIG. 2 shows the logical structure of the system of the invention.

FIG. 2 shows the system architecture of the invention. The system comprises the main processor (220) of the system manager workstation. The main processor of the system management station is able to communicate with the mobile program traveling in the network. With such a protocol, the main processor of the system management station is able to get the location list stored in the working area of the mobile program currently operating in a network element. The location list is the list of all the destinations the Mobile program has to visit to perform its tasks. In the storage (230) of the network management station, are represented the various logical blocks of the application. The network access (240) block is the interface allowing to communicate in the network with the network components. Via the network access interface, data are collected from the station on all the network elements belonging to the list that is obtained by the main processor; these data allows the computation of the topology information of the network elements represented by the logical block 'topology computing' (250). The computed topology is provided as inputs to a Neural Network application program (260). The Neural Network applications comprise, as well known, successive execution of programs including: creating Neural Network models, storing them, teaching the neural network with some sample topology inputs and finally running the taught Neural Network with the input topology collected in order to obtain the processed data. As explained later the Neural Network of the preferred embodiment is of a such type that there is no need for training it before first running. In output to the Neural Network application program (260) the data formatter (270) reads the result of the Neural Network computation and provides to the main processor of the system management station an ordered list of references representing the network elements to be successively reached by the mobile program. This computed short path list is then sent (280) by the station to the mobile program which will read it to reach the next network elements.

Figure 3:
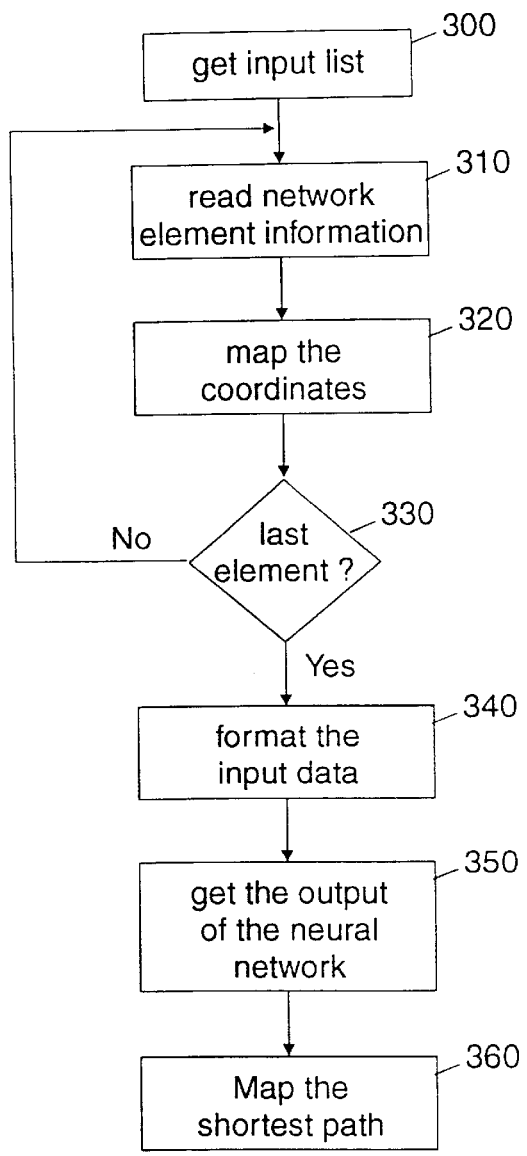
FIG. 3 is the general flowchart of the method for optimizing the network path of mobile programs according to the invention.

FIG. 3 shows the flow chart of the method for providing the shortest path to a mobile program traveling within the network. The first step (300) consists in reading the input list. This is the list of network elements the mobile program has to visit to run on them the system management service tasks. In the preferred embodiment of the invention, this list has been collected by the system manager workstation communicating with the mobile program currently installed in a network element. This communication could be any kind of communication protocol between applications, allowing to run remote commands from the system manager station on a network element such as CORBA (Common Object Request Broker) or RMI (Remote Method Invocation). This-protocol is used for a distributed environment supporting 'client server' approach. Using such a protocol, the main processor of the system management station is able to get the location list stored in the working area of the mobile program. The second step of the flow chart consists in, for each network element of the list, reading the network element information (310). These are the parameters associated to each network element such as the bandwidth of the lines to reach the next network elements to be visited, the speed line to reach them, the length and other parameters concerning said network elements such as the availability of processing (out of business hours for maintenance of software) etc . . . . For instance, the system management station may ask a network element to measure the response time between the neighboring nodes. The network element will have to send a request including a timestamp and to send back the result to the system management station. The process used by a network element to obtain the information is any communication process between nodes of the network. The system management workstation communicates with the network element for collecting the information through the network access (240) using a network management protocol such as SNMP (Simple Network Management Protocol) allowing to get information (GET Command) from the Network element; the network protocol itself can also be used such as TCP/IP with the PING command to collect information from the network elements. Once the data are collected, there are mapped to the two dimensional coordinates (320) expected as inputs to the Neural Network used in the preferred embodiment of the invention. The two dimensional coordinates comprise a first dimension with the reference to the network element or the segment of path between this network element and a preceding network element; the second dimension is a function of parameters collected for this node which could be at least one parameter or a combination of parameters. If all the network elements belonging to the mobile program input list have not been consulted (answer No to test 330) the next network element of the list is consulted (back to step 310). Once all the element information have been obtained (answer Yes to, test 330), the data are formatted (340) to meet the input format Neural Network requirement; then, the Neural Network is fed with the formatted data. The Neural Network provides as a result, an ordered list of the network elements (360) of the mobile program input list forming the shortest. In one preferred embodiment this list is sent to the mobile program by the system management station.

Figure 4:
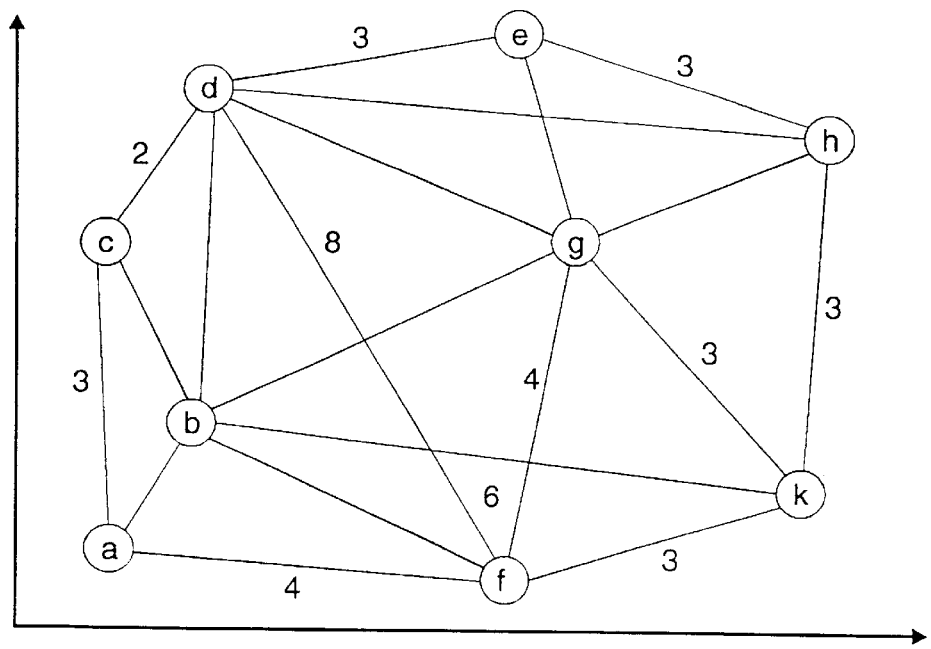
FIG. 4 illustrates the various access time between the nodes of the network.

FIG. 4 is an example of network elements in a network which have to be visited by the mobile program. They belong to the input list stored by the mobile program. This is a topological representation of the network elements and some the topology information which has been collected by the management station. In this example, the topology information is the Round Trip Time (RTT) parameter which is the elapsed time between the time where a packet has been sent on the line and received back. The couple of network elements (a, f) is characterized by 3 milliseconds which is the RTT from a to f and back to a. The couple of network elements (d, f is characterized by a 8 millisecond RTT etc . . . . These RTT data are collected by the system management station by send request to each of the network element of the mobile program input list. In this example, the 'shortest path length' will be the path with the shortest RTT.

Figure 5:
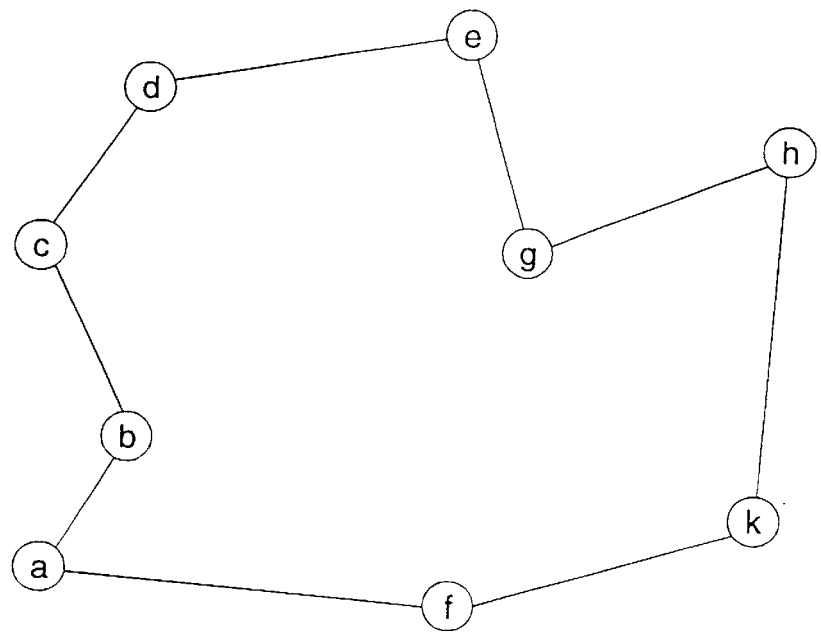
FIG. 5 shows the final computed 'shortest path' to visit all the nodes served in the network by the mobile program.

In FIG. 5 we consider that the topology information of FIG. 4 is given as bi-dimensional input to the Neural Network which computes the shortest path between all the nodes. The map of FIG. 5 represents the shortest path in term of access time between the different nodes. It is the shortest path for the topology which has been chosen to qualify it. For instance, if we consider that we need to visit all the nodes but we also need to distribute to the node a 100 Mb file, we will need to introduce a 'bandwidth' parameter in the topology. In this case the 'shortest path length' will be the path with the minimum Transmission Delay; the transmission delay being the rate at which bits can be successfully sent across a media connecting two nodes.

It is possible to simulate hardware neural network (parallel) computers on a Von Neumann (serial) processor system. There are many different neural network models with different connection topologies and different processing unit attributes. However, there can be described as computing systems which are made of many (tens, hundreds, thousands) simple processing units (21) connected by adaptive weights (22). It is known that weights are used to qualify the degree of importance applied to communications of nodes inside a neural network. The weights are modified while the neural network is taught. In addition, to processors and weights, a neural network model must have a learning mechanism (23) which operates by updating weights after each training iterations. The weights represents the output of the activation function before the processing units. A hardware neural network model can be simulated on digital computer by programs and data. Programs (24) simulate the processing functions performed by neural network processing units (21); adaptive connection weights are stored as data (25). Programs (26) are used also to implement the learning or connection weight adaptation mechanism (23).

The most adapted Neural Network for establishing the good order in the list of nodes to be successively visited is a Kohonen neural network. More generally, the advantage of using an Artificial neural network (ANN) such as Kohonen is triple: firstly, an ANN is excellent to generalize problems. This contrasts with conventional algorithms which often need to be tested with all possible combinations of input data: this unfeasible for complex problems; secondly, ANN are trained rather than explicitly programmed; this means that in many areas, where the problem is too complex to provide a comprehensive theory, an ANN may still be able to solve new problems if is shown a sufficient number of data. No expert is needed to provide rules which often turn out to be incorrect or incomplete). With feature-extraction Neural Networks, they may find patterns and features without any supervision. Thirdly, an ANN can be designed to operate as a function of approximation, specially in cases where the function is so complex that one has not been able to find a sufficient simple but accurate approximation by conventional mathematical methods. Kohonen neural network is a technique that allows to project multidimensional points to two dimensional network. The input for path length optimization can be always reduced to a bi-dimensional data: the first dimension will be the reference to the two nodes for which the 'length' is calculated, the second dimension will be the at least one parameter or any combination of parameters qualifying the type of length which is to be optimized: the physical path length, conversion protocol and line bandwidth. Kohonen neural network is an enhancement of competitive learning. It extends the competition over spatial neighborhoods. While competitive learning only updates the weights of the winning output, Kohonen learning also updates the weights within a neighborhood of the winning output. A Kohonen Neural Network always minimizes the energy; whatever the definition of the energy given in input as the second dimension. One other characteristic of Kohonen Neural Network is that there is no need of training, the training phase is performed simultaneously to the first running.

While the invention has been described in terms of preferred embodiments, those skilled in the art will recognize that the invention can be practiced with modifications within the spirit and the scope of the appended claims.

What is claimed is:

1. A method comprising the steps of:
    a. getting a list of network nodes to be visited by a data string traversing a communications network;
    b. defining at least one parameter or a combination of parameters; characterizing the path length to be minimized between each pair of network nodes of said list;
    c. getting the value of the at least one parameter from said each pair of network nodes and computing its path length;
    d. mapping a reference to said each pair of nodes and the computed path length to bi-dimensional coordinates;
    e. running a Kohonen neural network taking said bi-dimensional coordinates as input; and,
    f. obtaining, in an output of said Kohonen neural network, an ordered list of network nodes representing a shortest path between all the nodes.

2. The method according to claim 1 comprising the initial step of defining a neural network as a Kohonen neural network.

3. The method according to claim 1 or 2 wherein step a is performed by a system management workstation getting said list from a mobile program traveling over the network and having to visit all the network nodes of said list.

4. The method according to claim 3 wherein getting operation of step a is performed using an application to application protocol such as RMI or CORBA.

5. The method according to claim 3 wherein getting the at least one parameter values operation of step c is performed by said system management workstation.

6. The method according to claim 5 wherein said system management workstation communicates with said network nodes using a network communication protocol such as TCP/IP or SNMP.

7. The method according to claim 1 wherein one of the at least one parameter defined in step b is the Round Trip Time between said network address and the next network address in said list.

8. The method according to claim 1, wherein one of the at least one parameter defined in step b is the bandwidth of the line between two network nodes.

9. The method according to claim 1, wherein one of the at least one parameter defined in step b is the availability of the machine or the application of said network node.

10. The method according to claim 1, said method being implemented as a software program operating on a system management workstation.

11. The method according to claim 3, said method further comprising a step of sending said ordered list of network nodes to said mobile program.

12. A system comprising:
- a system management workstation connected with a plurality of elements defining a network and managing the network; and
- a mobile program traveling over the network; said system management workstation and said mobile program cooperating to:
  a. get a list of network nodes to be visited;
  b. define at least one parameter or a combination of parameters characterizing the path length to be minimized between each pair of network nodes of said list;
  c. get, for each pair of network nodes of said list, the at least one parameter values from said network nodes and computing its path length;
  d. map, for each pair of network nodes of said list, respectively a reference to said couple of nodes and the computed path length to bi-dimensional coordinates;
  e. run a Kohonen neural network taking said bi-dimensional coordinates as input;
  f. obtain, in output of said Kohonen neural network, an ordered list of network nodes representing said shortest path between all the nodes; and
  g. send said ordered list to said mobile program.

* * * * *